US012625256B2

(12) United States Patent
Rezaei

(10) Patent No.: US 12,625,256 B2
(45) Date of Patent: May 12, 2026

(54) DETERMINING LOCALIZATION ERROR

(71) Applicant: GM Cruise Holdings LLC, San Francisco, CA (US)

(72) Inventor: Shahram Rezaei, Danville, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 629 days.

(21) Appl. No.: 17/898,003

(22) Filed: Aug. 29, 2022

(65) Prior Publication Data

US 2024/0069188 A1    Feb. 29, 2024

(51) Int. Cl.
G01S 13/931    (2020.01)
G01C 21/16    (2006.01)
G01S 7/497    (2006.01)

(52) U.S. Cl.
CPC .......... G01S 13/931 (2013.01); G01C 21/165 (2013.01); G01S 7/497 (2013.01)

(58) Field of Classification Search
CPC ........ G01S 13/931; G01S 7/497; G01S 17/86; G01S 17/931; G01S 13/867; G01S 2013/9323; G01C 21/165; G01C 21/3815; G01C 21/30
See application file for complete search history.

(56) References Cited

U.S. PATENT DOCUMENTS 9,719,801 B1 * 8/2017 Ferguson ........... G01C 21/3602
2019/0339396 A1   11/2019 Turunen 2020/0263996 A1 * 8/2020 Gokhale ................ G01C 21/32
2021/0070286 A1 * 3/2021 Green .................... G06V 10/25
2021/0157325 A1 * 5/2021 Beller ................. B60W 60/001
(Continued)

FOREIGN PATENT DOCUMENTS

WO    WO2019195363 A1 * 10/2019    ............. G01D 21/02

OTHER PUBLICATIONS

B. Rodrigues, E. J. Scheid, J. Willems, M. Tornow, K. O. E. Müller and B. Stiller, "Fuslon Data Tracking System (FITS)," in IEEE Sensors Journal, vol. 22, No. 19, pp. 19060-19072, 1 Oct. 1, 2022, doi: 10.1109/JSEN.2022.3196262. (Year: 2022).*

(Continued)

*Primary Examiner* — Wade Miles
*Assistant Examiner* — Jaewook Jung
(74) *Attorney, Agent, or Firm* — Honigman LLP; Matthew H. Szalach; Jonathan P. O'Brien

(57)    ABSTRACT

The disclosed technology provides solutions for improving the accuracy of localization error estimates and in particular, provides methods for improving the accuracy of error estimates associated with individual localizers. A method of the disclosed technology can include steps for receiving a first location error estimate, corresponding with a first localizer of a first autonomous vehicle (AV), receiving a second location error estimate, corresponding with a second localizer of the first AV, and associating the first location error estimate and the second location error estimate with first location metadata and first environmental metadata corresponding with the first AV. The method can further include steps for determining a location error variance for the first localizer, based on the first location metadata, and the first environmental metadata. Systems and machine-readable media are also provided.

20 Claims, 5 Drawing Sheets

(56)                    References Cited

U.S. PATENT DOCUMENTS

2022/0080998 A1 *   3/2022  Kim ................... B60W 60/001

OTHER PUBLICATIONS

M. Ahmadi-Pour, T. Ludwig and C. Olaverri-Monreal, "Statistical modelling of multi-sensor data fusion," 2017 IEEE International Conference on Vehicular Electronics and Safety (ICVES), Vienna, Austria, 2017, pp. 196-201, doi: 10.1109/ICVES.2017.7991925. (Year: 2017).*

* cited by examiner

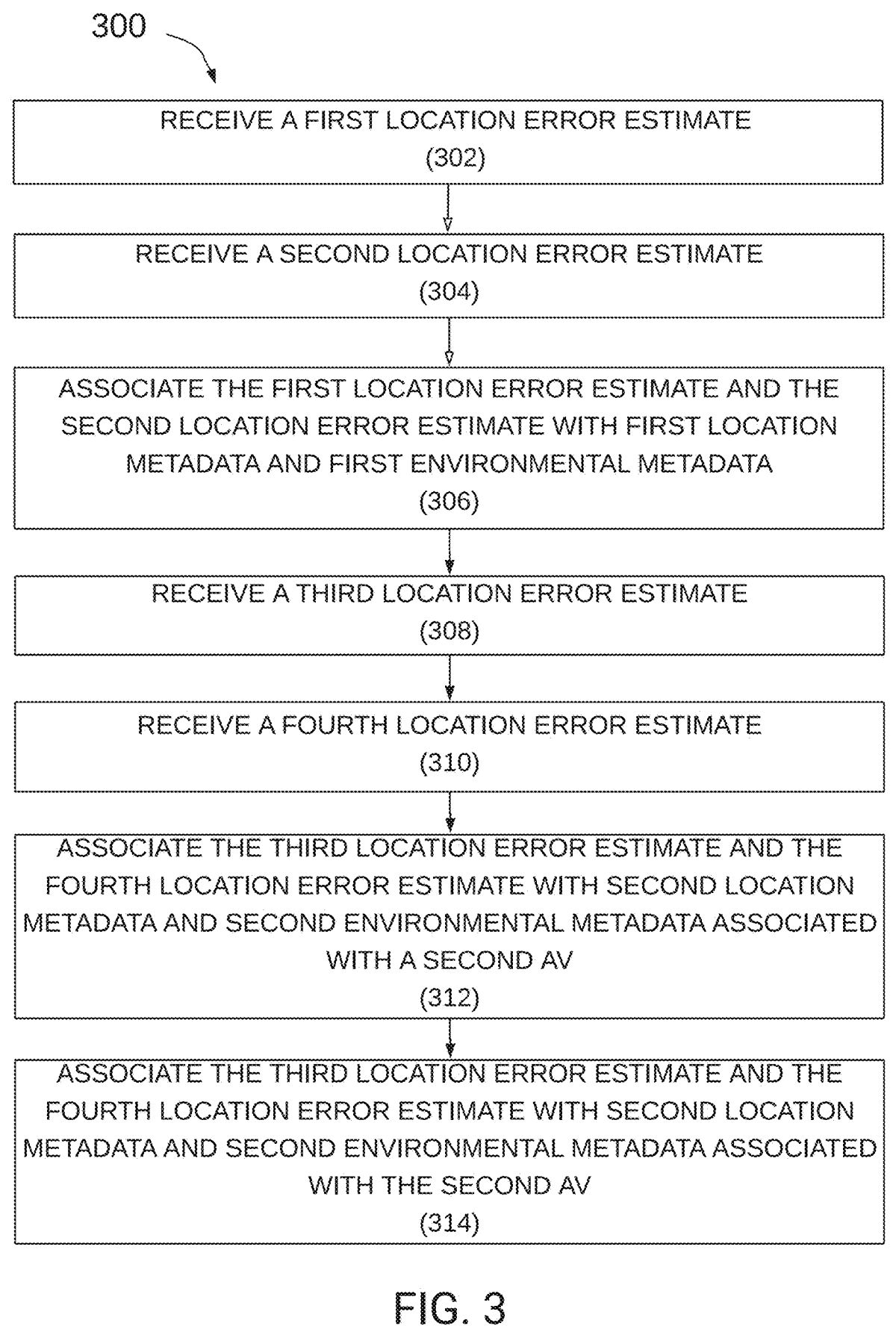

300

RECEIVE A FIRST LOCATION ERROR ESTIMATE
(302)

RECEIVE A SECOND LOCATION ERROR ESTIMATE
(304)

ASSOCIATE THE FIRST LOCATION ERROR ESTIMATE AND THE
SECOND LOCATION ERROR ESTIMATE WITH FIRST LOCATION
METADATA AND FIRST ENVIRONMENTAL METADATA
(306)

RECEIVE A THIRD LOCATION ERROR ESTIMATE
(308)

RECEIVE A FOURTH LOCATION ERROR ESTIMATE
(310)

ASSOCIATE THE THIRD LOCATION ERROR ESTIMATE AND THE
FOURTH LOCATION ERROR ESTIMATE WITH SECOND LOCATION
METADATA AND SECOND ENVIRONMENTAL METADATA ASSOCIATED
WITH A SECOND AV
(312)

ASSOCIATE THE THIRD LOCATION ERROR ESTIMATE AND THE
FOURTH LOCATION ERROR ESTIMATE WITH SECOND LOCATION
METADATA AND SECOND ENVIRONMENTAL METADATA ASSOCIATED
WITH THE SECOND AV
(314)

FIG. 3

DETERMINING LOCALIZATION ERROR

BACKGROUND

1. Technical Field

The disclosed technology provides solutions for improving the accuracy of localization estimates and in particular, provides methods for improving localization accuracy by improving location error estimates associated with individual localizers.

2. Introduction

Autonomous vehicles (AVs) are vehicles having computers and control systems that perform driving and navigation tasks conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning and obstacle avoidance. Performance of such tasks relies on accurate localization measurements of the AV, as well as various objects in the AV's environment.

BRIEF DESCRIPTION OF THE DRAWINGS

Certain features of the subject technology are set forth in the appended claims. However, the accompanying drawings, which are included to provide further understanding, illustrate disclosed aspects and together with the description explain the principles of the subject technology. In the drawings:

FIG. 3 illustrates a flow diagram of an example process for improving localization error estimates for a multitude of localizer types, according to some aspects of the disclosed technology.

DETAILED DESCRIPTION

Figures 1A, 1B:
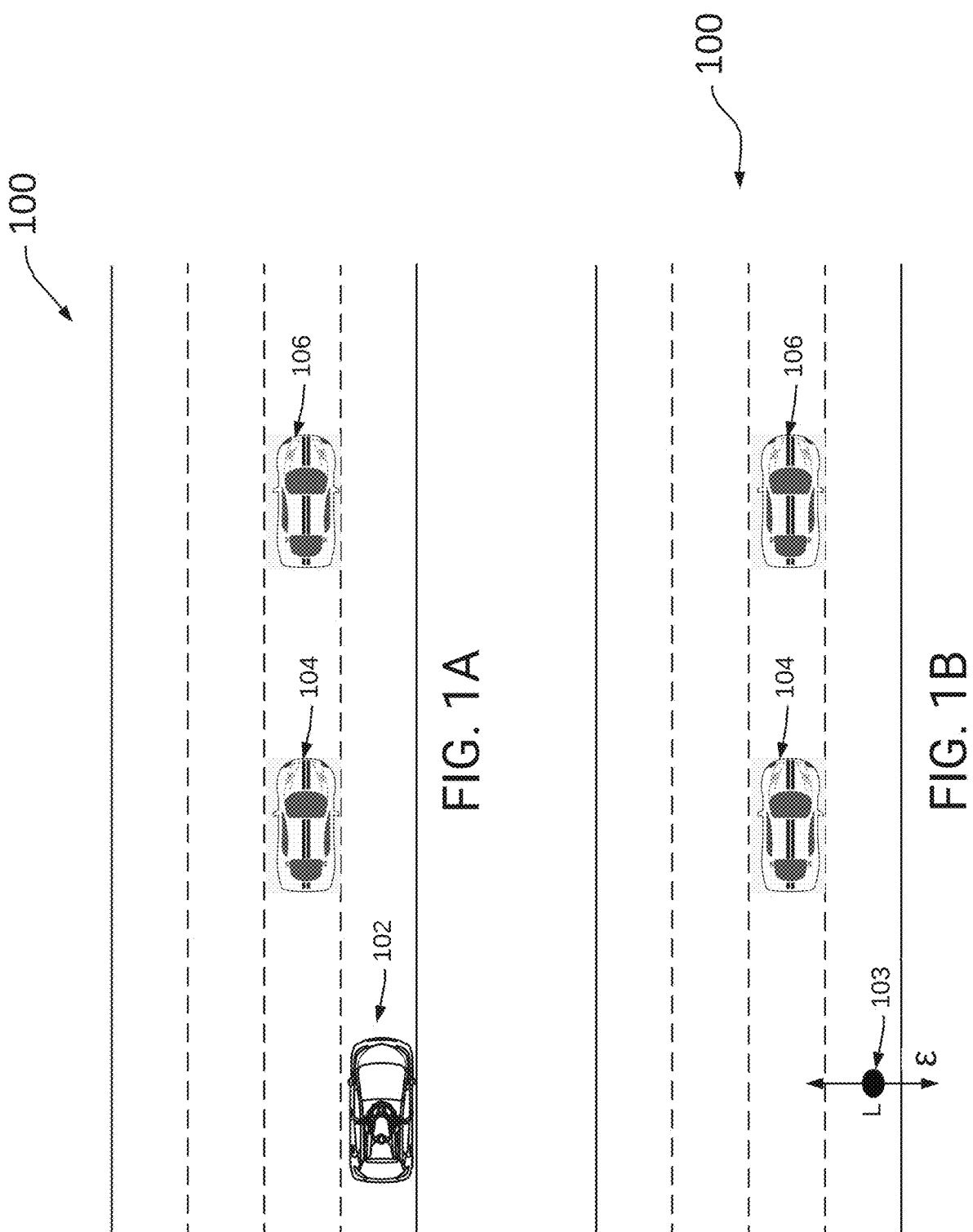
FIGS. 1A and 1B conceptually illustrate a context in which new location error estimates may be computed for each of a variety of AV localizers, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring certain concepts.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Perception systems of autonomous vehicles (AVs) are designed to detect objects in the surrounding environment to execute effective navigation and planning operations. To facilitate navigation and routing decisions, such systems rely on an accurate understanding of AV location and pose with respect to the surrounding environment. Some AV localization systems utilize location measurements derived using multiple localization sub-systems (e.g., individual localizers) and their supporting algorithms. As used herein, a localizer can refer to any system/s or device/s (including hardware and/or software) that can be used to make location estimates. By way of example, an AV localization system may utilize multiple localizers including but not limited to one or more: Global Navigation Satellite System (GNSS), Inertial Measurement Unit (IMU), camera-based localizers, Light Detection and Ranging (LiDAR) localizers, Vehicle-to-Everything (V2X) chipsets, radar-based localizers, or a combination thereof (e.g., a lane-matching localizer, etc.).

To determine vehicle position, location and corresponding location uncertainty estimates for each localizer can be provided to a sensor fusion process to then determine or estimate a most likely location and location error for the vehicle. Depending on the desired implementation, a sensor fusion process can be designed to consider statistical confidences when making final location and location error estimates. For example, location and location error estimates originated from a less reliable localizer may be weighted less prominently in the final location calculation.

One barrier to location estimation accuracy is that location uncertainty estimates for any individual localizer may themselves be inaccurate, leading to situations where the resulting location error estimates are under (or over) approximated. Additionally, uncertainty estimates for different localizer types may vary depending on a number of factors, including location, weather, and/or the properties of various objects in relation to the localizer. By way of example, satellite-based localizers (e.g., GNSS) may be less accurate in areas where it is difficult to receive satellite signals, such as in tunnels, parking structures, or garages, etc., and/or in areas adjacent to tall buildings. Similarly, LiDAR based localizers may be less accurate in environs where beam reflection is low, such as in desolate areas with few reflecting objects, and/or in areas where surrounding objects have diffuse reflection properties, such as in environments with lots of foliage.

Aspects of the disclosed technology provide solutions for improving location estimation generally and in particular, for improving location error estimates on a per-localizer basis. When a localizer (e.g., a GNSS localizer) performs a localization instance, an estimated location (L) and uncertainty estimate (E) are generated. Uncertainty estimates (also: location uncertainty estimates) for a given localizer type may be generated at each localization instance performed by the corresponding localizer. During post-processing, a location error estimate (or error estimate) can be generated based on the uncertainty estimate. For example, by comparing the estimated location of the AV to an actual or ground-truth location of the AV, an (actual) error estimate can be computed. By computing various statistics (e.g., averages) of multiple error estimates for a given localizer, the uncertainty estimates used for the localizer can be updated, thereby improving the accuracy of the localizer, and consequently improving the overall location estimation that is performed using outputs from multiple localizers.

Uncertainty estimates and/or the resulting location error estimates can also be associated (or correlated) with various characteristics that obtain when the localization instance is performed. For example, each uncertainty estimate (and/or resulting error estimate) for a given localizer may be associated with a location of the localizer when the uncertainty estimate was generated and/or may be associated with various environmental characteristics attendant at the location and/or time that the uncertainty estimate was generated. As such, each location error estimate can be associated with location metadata (e.g., identifying a location where the uncertainty estimate was generated) and/or environmental metadata (e.g., identifying environmental conditions associated with a given uncertainty measurement). As used herein, environmental metadata can refer to any of a variety of environmental variables related to an environment navigated by the AV. For example, and without limitation, environmental metadata may include information that describes lighting characteristics, and/or weather characteristics e.g., ground visibility, cloud cover, precipitation, and/or temperature, etc. Environmental metadata may also include information describing characteristics about objects around the AV, including but not limited to: a presence of foliage, a presence of ground fog or other atmospheric events, the existence and/or location of tall buildings or reflective surfaces, and/or measures of scene complexity (i.e., an amount of motion and/or number of objects/entities that are detectable by various AV sensors, etc.).

For each localizer type, uncertainty estimates and corresponding metadata (i.e., location and environmental metadata) can be aggregated across multiple localization instances. For example, multiple (different and sometimes repeated) uncertainty estimates for a camera-based localizer can be provided to a centralized database (e.g., a remote server), wherein each uncertainty estimate instance is associated with location and environmental metadata. The associated location data may indicate a location (e.g., a map location) where the uncertainty estimate was generated; similarly, the environmental metadata can contain information about characteristics of the environment around or proximate to the AV when the uncertainty estimate was generated. Depending on the desired implementation, uncertainty estimates for each localizer type may be aggregated multiple times, either from the same AV, or from multiple sources (e.g., different AVs), such as across two or more vehicles in an AV fleet. By way of example, aggregated uncertainty estimate data for GNSS localizers may include multiple uncertainty estimate instances made from a single AV, or from one or more error estimates made by different AVs.

During post-processing, location error estimates can be computed for each uncertainty estimate. Error estimates can be based on post facto determinations of location error based on a comparison of the originally estimated location of the AV and actual location that is determined during post-processing. Subsequently, the error estimates can be used to compute revised or corrected measures of location uncertainty, e.g., for a given location and/or given environmental conditions. That is, by associating each error estimate with location and/or environmental metadata (e.g., based on the underlying uncertainty estimate), error estimate values for similar localizer types can be aggregated and various statistics computed on the basis of their similarity. For example, an average error estimates can be computed for each localizer type, for a particular location, and/or for specifically corresponding environmental characteristics. As another example, GNSS localizer errors, for multiple different location estimation instances, can be used to compute new localizer error values, e.g., based on averages of large numbers of received GNSS localizer error data points. In some instances, average error estimate values computed for a given localizer type (e.g., GNSS, LiDAR, camera, etc.) can be based on error estimate data that share location and/or environmental similarities, as specified by the location and/or environmental metadata. Further details regarding the computation of error estimates for various localizer types are provided with respect to FIGS. 1A and 1B, below.

FIGS. 1A and 1B conceptually illustrate a context in which new error estimates may be computed for each of a variety of AV localizers. In particular, FIGS. 1A and 1B represent an example environment 100 in which localization functions can be performed by an AV 102. As illustrated in the example of FIG. 1A, AV 102 may perform localization functions using data collected from various localizers, including but not limited to one or more GNSS, Inertial Measurement Units (IMUs), optical sensor systems (e.g., LiDAR, laser, and/or camera), and/or one or more radar sensors, etc. To facilitate effective maneuver and navigation functions, a localization system of AV 102 must perform location estimation, at least, accurately enough to avoid collisions with other road users, such as vehicles 104 and/or 106, etc.

FIG. 1B conceptually illustrates a location estimate 103 for AV 102. As illustrated, the estimated location of AV 102 is given by point L, whereas a corresponding uncertainty estimate E, denotes the location uncertainty (or statistical confidence) associated with location estimate L. Together, the location estimate (L) and/or location uncertainty estimate (E) can represent a location prediction made with respect to a specific localizer, a specific localizer class (or type), and/or can represent aggregated location and uncertainty estimates for multiple localizers, e.g., for the entire AV 102. As depicted in the example of environment 100, uncertainty estimate E represents a predicted error (or location confidence) that may be unacceptable for navigation of AV 102 within environment 100, e.g., because the error is larger than the size of the designated lane boundaries, for example.

As discussed above the localization accuracy for any given localizer can depend on location and/or environmental characteristics; therefore, one of the issues in using conventional uncertainty estimates is that there is typically no way to know an accuracy of the uncertainty estimate. In the example of FIG. 1, uncertainty estimate E may be an overestimate (i.e., larger than the actual error) given the location and environmental conditions around AV 102. In such instances, AV 102 may be erroneously removed from operation due to unacceptably large localization error, whereas the actual error, which may be much smaller, would be acceptable for operation of AV 102. In contrast, uncertainty estimate ε may be smaller than the actual location error (or location error variance) at a given location and/or for a given environment. Improvements in the accuracy of uncertainty estimates ($\varepsilon$) can be realized by computing actual error estimate values (error estimates) for each localization instance—i.e., (L, $\varepsilon$) pair—and taking an average of the location error estimates. In such instances, the computed average error estimate may closely approach the actual location measurement error for a given location and/or environmental conditions, e.g., according to the central limit theorem (CLT). That is, location and/or environmental metadata may be used to segment error estimates, and for a given localizer type, thereby improving the uncertainty accuracy for specific localizers, in specific locations, and/or that are operating under specific conditions.

Figure 2:
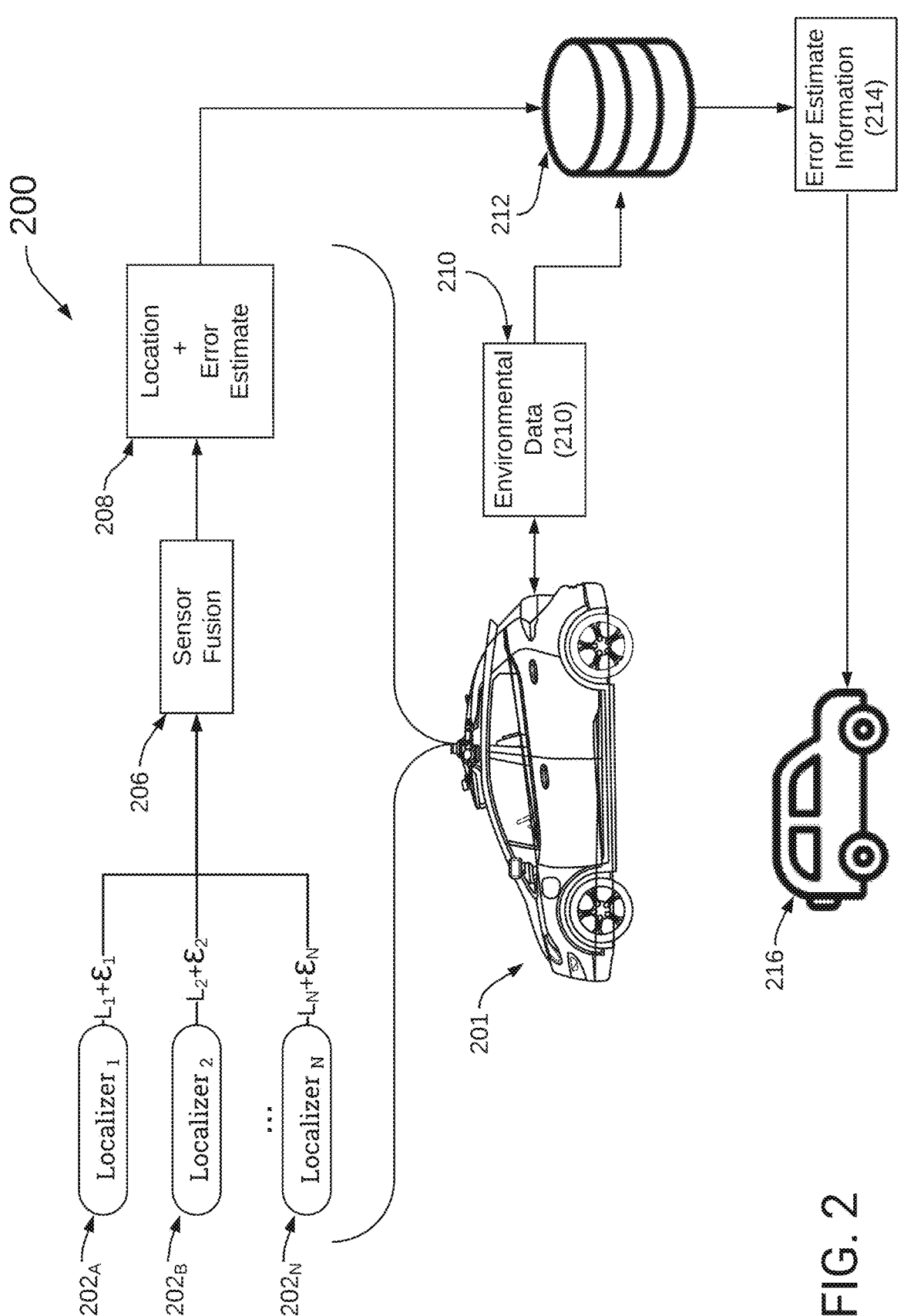
FIG. 2 illustrates an example system for aggregating localization uncertainty estimates, for example, from a multitude of localizers, according to some aspects of the disclosed technology.

FIG. 2 illustrates an example system 200 for aggregating uncertainty estimates from a multitude of localizers (collectively 202) on AV 201. Depending on the desired implementation, and as discussed above, multiple uncertainty estimates may be collected from a given localizer, and/or for a specific localizer type. In other implementations, uncertainty estimates can be collected from any number of AVs, and their respective localizers, such as two or more AVs in an AV fleet 216.

Each localizer 202 can be configured to perform localization functions, thereby generating location estimates and corresponding uncertainty estimates for each localization instance. Localizers of different type can use different position estimation methodologies, e.g., using one or more GNSS measurements, LiDAR measurements, camera-based positioning measurements, IMU measurements, and the like. As illustrated in the example of system 200, AV 201 is equipped with a variety of localizers (e.g., Localizer$_1$ 202A, Localizer$_2$ 202B-Localizer$_N$ 202N. It is understood that AV 201 can have virtually any number and/or type of localization system/s, without departing from the scope of the disclosed technology.

In practice, each localizer 202 can generate a location estimate (L), and a uncertainty estimate ($\varepsilon$) at each localization instance. By way of example, if Localizer$_1$ 202$_A$ is a GNSS localization system, then L$_1$ can represent a GNSS location estimate, and $\varepsilon_1$ can represent an uncertainty estimate associated with L$_1$. As discussed above, uncertainty estimates for each localizer type can vary depending on a variety of factors, including a location and environment surrounding AV 201 when the location and location error estimate are generated. For example, in the case of a GNSS localization system, GNSS localization accuracy may be different if the localization instance is performed while AV 201 is in a tunnel, versus if the localization instance is performed while AV 201 is on an open road. Similarly, environmental factors, such as cloud coverage can affect the actual location error. In normal operation, location and uncertainty estimates from each localizer 202 are provided by the AV 201 to a sensor fusion process 206. The sensor fusion process 206 can be configured to generate an aggregated or final location estimate 208, based on individual inputs provided by each localizer 202 to the sensor fusion process 206. Depending on the desired implementation, the sensor fusion process 206 may employ one or more physics-based algorithms or modeling approaches, such as by using a Kalman filter to determine a relative weighting of various localizer inputs.

In some implementations, location and uncertainty estimates from the various localizers 202 can be associated with environmental data 210, and then provided to a remote data repository, e.g., a database 212. As discussed above, environmental data (or environmental metadata) 210 may include any information that describes lighting characteristics, and/or weather characteristics e.g., ground visibility, cloud cover, precipitation, and/or temperature, etc. Environmental metadata may also include information describing characteristics about objects around the AV 201, including but not limited to: a presence of foliage, a presence of ground fog or other atmospheric events, the existence and/or location of tall buildings or reflective surfaces, and/or measures of scene complexity (i.e., an amount of motion and/or number of objects/entities detectable by various AV sensors, etc.). In some instances, environmental metadata may be received from an external source, such as a weather service. That is, environmental metadata is not limited to data that is collected by the AV 201.

Although the example of FIG. 2 illustrates a single AV (e.g., AV 201) providing these error estimates, any number of other vehicles, such as other AV fleet vehicles, can provided similar location information, location error information, and environmental data to database 212. As such, location error estimates for a given localizer type may be aggregated for similar locations and/or similar environmental profiles, and then averaged to determine new (more accurate) error estimates for each localizer type.

By way of example, location error estimate information for a camera-based localizer may be aggregated at database 212 and used to generate improved location error estimate information for specific locations and/or for specific environmental conditions, e.g., those with high complexity, low complexity, or with specific environmental features present, such as the presence of foliage, tall buildings, or other features than may affect localization accuracy. The improved location error estimates 214 can then be provided to other AVs, such as AV 216, which may be part of an AV fleet, and used to improve the location estimates made by various localizers therein.

Improved error estimate information 214 can be associated with a particular localizer type, as well as a location and/or specific environmental features. If receiving AV 216 receives updated error estimate information 214 from database 212, it may be used to improve uncertainty estimates by various localizers when the AV 216 is in a similar location or is in a location that has similar environmental features to those associated with the error estimate information 214. By way of example, if the improved/updated error estimate information 214 specifies updated location estimate information for GNSS localizers that are performing in crowded downtown areas, with tall buildings, the new/improved error estimate 214 may be used by AV 216 when its own GNSS localizer is performing in a similar environment. For example, subsequent localization instances performed by the GNSS localizer may utilize the new error estimate 214 in place of the previous uncertainty estimate that was used by the localizer. By improving the uncertainty estimates for each localizer type, the aggregated location error estimate associated with the sensor fusion process (e.g., process 206), can be similarly improved, thereby improving an understanding of where and under what environmental circumstances the AV can be operated.

FIG. 3 illustrates a flow diagram of an example process 300 for improving localization error estimates for a variety of localizer types. Localizers may include but are not limited to one or more Global Navigation Satellite Systems (GNSSs), Inertial Measurement Units (IMUs), camera-based localizers, Light Detection and Ranging (LiDAR) based localizers, Vehicle-to-Everything (V2X) chipsets, radar-based localizers, etc.

At step 302, the process 300 includes receiving a first location error estimate, corresponding with a first localizer of a first autonomous vehicle (AV). By way of example, the first localizer of the first AV may be a GNSS localizer. The first location error estimate can be generated based on processing performed (e.g., after the localization instance is generated), to determine an actual location error for the first AV. By way of example, a predicted location of the first AV can be compared to an actual (or ground-truth location), to determine/calculate the first location error estimate.

At step 304, the process 300 includes receiving a second location error estimate, corresponding with a second localizer of the first AV. By way of example, the second localizer of the first AV may be a camera-based localizer.

At step 306, the process 300 includes associating the first location error estimate and the second location error estimate with first location metadata and first environmental metadata corresponding with the first AV. As discussed above, the environmental metadata can include any information about the surrounding environment of the first AV, for example, at a time that the first and second localization instances were performed. By way of example, the first environmental metadata may include information about lighting conditions around the first AV, indications of a complexity of the environment, e.g., based on a number of entities surrounding the first AV and/or a complexity of entity trajectories, etc. That is, the first location error estimate and second location error estimate may be computed based on localization data generated at different times and/or relatively simultaneously, so long as the location and/or environmental characteristics attendant at the time of the localization instances was similar (e.g., a similar location and/or a similar environment).

At step 308, the process 300 includes receiving a third location error estimate, corresponding with a first localizer of a second autonomous vehicle (AV). The second autonomous vehicle can be different from the first AV, but in some instances, may utilize localizers of a similar type. For example, the first localizer of the second AV may also be a GNSS localizer.

At step 310, the process 300 includes receiving a fourth location error estimate, corresponding with a second localizer of the second AV. Further to the above example, the second localizer of the second AV may also be a camera-based localizer.

At step 312, the process 300 includes associating the third location error estimate and the fourth location error estimate with second location metadata and second environmental metadata associated with the second AV.

At step 314, the process 300 includes determining a new location error (or location error variance) for each of the first localizer (e.g., the GNSS localizer) and the second localizer (e.g., the camera-based localizer), based on the first location metadata, the first environmental metadata, the second location metadata, and the second environmental metadata.

As discussed above, some environmental variables may affect certain localizer types, without having an effect on the others. For example, the first localizer of the first and second AVs may both be GNSS localizers. In this instance, the GNSS localization error could depend on the location of the AV when a location estimate is performed. Similarly, the second localizer of the first and second AVs may both be camera-based localizers. In these instances, the location estimation error may be affected by ambient light levels, and/or scene complexity, etc. By computing error variance (or error averages) for localizers of each type, more precise location error estimates may be determined for each localizer, on a per-location, and/or per-environment basis.

The new location error can be used to update location errors used by the respective localizers, e.g., in certain locations and/or under certain environmental conditions. As such, subsequent or future localization estimates made by the first localizer and/or the second localizer may use specific (newly updated) location error estimate information corresponding with location and/or environmental conditions for which the new location error estimates were computed. Additionally, the newly determined or calculated error estimates for a given location and localization type may be used by other localizers of a similar type when used at that location and/or under similar environmental conditions, thereby improving location estimates on a per-localizer basis for each localizer type.

Figure 4:
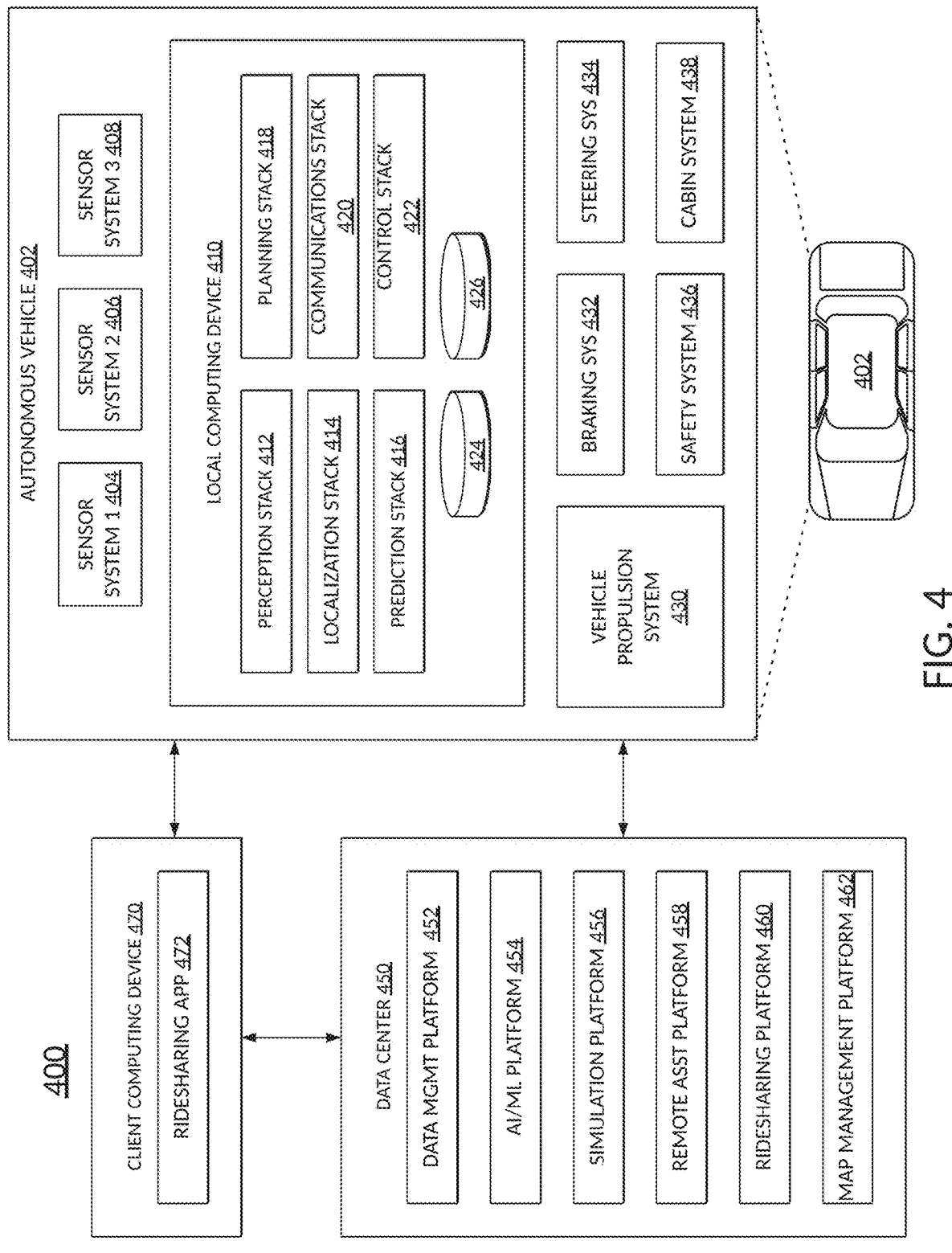
FIG. 4 illustrates an example system environment that can be used to facilitate AV dispatch and operations, according to some aspects of the disclosed technology.

FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 150, and a client computing device 170. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), optical sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some embodiments, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a prediction stack 416, a planning stack 418, a communications stack 420, a control stack 422, an AV operational database 424, and an HD geospatial database 426, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some embodiments, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some embodiments, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communications stack 420 can transmit and receive signals between the various stacks and other components of the AV 402 and between the AV 402, the data center 450, the client computing device 470, and other remote systems. The communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 426 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408, stacks 412-422, and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470.

These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ridesharing platform 460, and a map management platform 462, among other systems.

The data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from a cartography platform (e.g., map management platform 462); modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
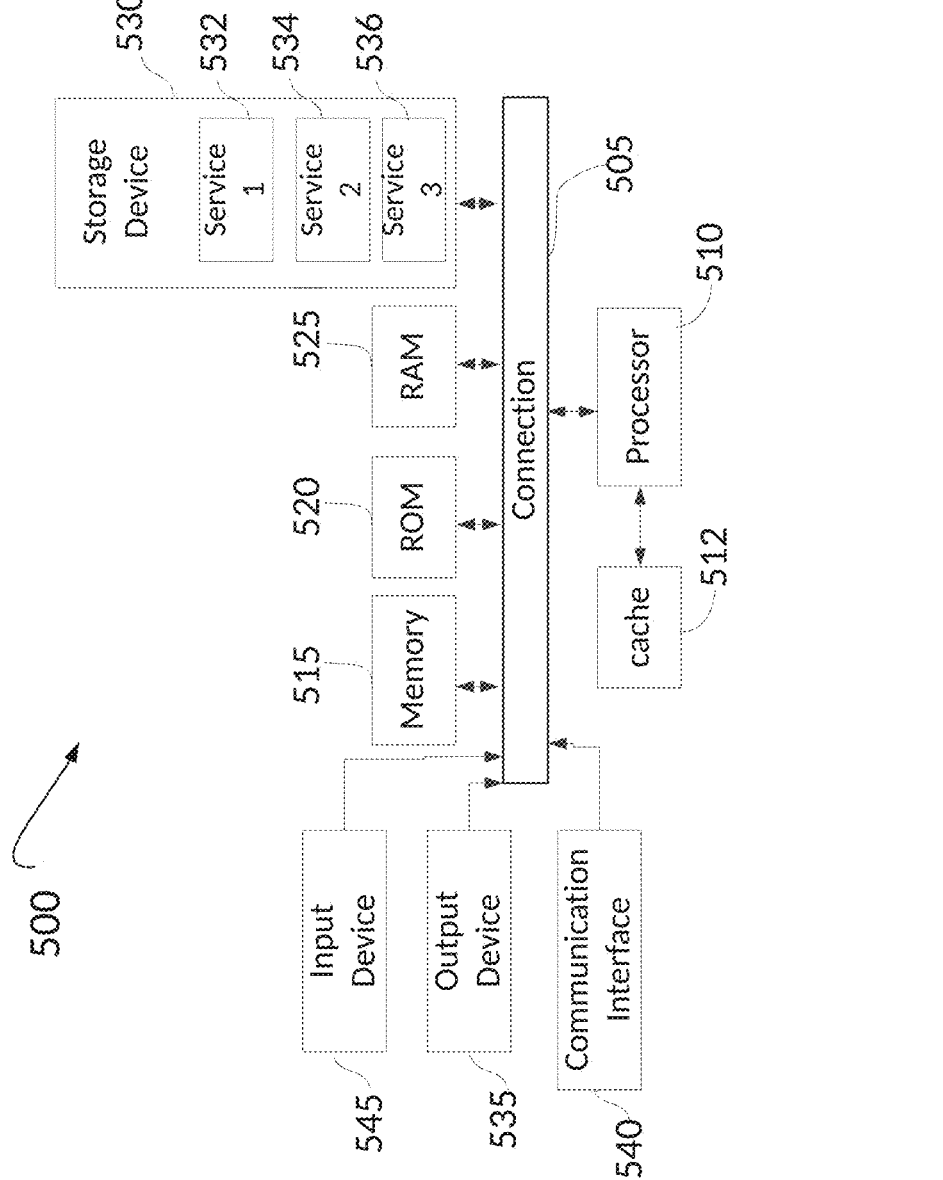
FIG. 5 illustrates an example processor-based system with which some aspects of the subject technology can be implemented.

FIG. 5 illustrates an example apparatus (e.g., a processor-based system) with which some aspects of the subject technology can be implemented. For example, processor-based system 500 can be any computing device making up internal computing system 410, remote computing system 450, a passenger device executing the rideshare app 470, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for determining a localization error, comprising:

at least one memory; and at least one processor coupled to the at least one memory, the at least one processor configured to:

receive a first location error estimate, corresponding with a first localizer of a first autonomous vehicle (AV), the first localizer of the first AV comprising a Light Detection and Ranging (LiDAR) localizer;

receive a second location error estimate, corresponding with a second localizer of the first AV, the second localizer of the first AV comprising a Global Navigation Satellite System (GNSS) localizer;

associate the first location error estimate and the second location error estimate with first location metadata and first environmental metadata corresponding with the first AV, the first environmental metadata comprising a first measure of scene complexity based on a first amount of motion of moving entities detected by the first AV and an indication of a presence of foliage having diffuse reflection properties that degrade accuracy of the first localizer of the first AV;

receive a third location error estimate, corresponding with a first localizer of a second AV, the first localizer of the second AV comprising a LiDAR localizer;

receive a fourth location error estimate, corresponding with a second localizer of the second AV, the second localizer of the second AV comprising a GNSS localizer;

associate the third location error estimate and the fourth location error estimate with second location metadata and second environmental metadata associated with the second AV, the second environmental metadata comprising a second measure of scene complexity based on a second amount of motion of moving entities detected by the second AV and an indication of a presence of foliage having diffuse reflection properties that degrade accuracy of the first localizer of the second AV;

determine a location error variance for each of the first localizer and the second localizer of the first AV, based on the first location metadata, the first environmental metadata, the second location metadata, and the second environmental metadata; and transmit the location error variance to the first AV, the location error variance, when received by the first AV, is configured to cause the first AV to update an uncertainty parameter of the first localizer or the second localizer of the first AV during a subsequent localization instance when the first AV determines that a similarity score between third environmental metadata corresponding with the first AV and the first environmental metadata exceeds a predetermined threshold, wherein the updated uncertainty parameter is used by a sensor fusion process of the first AV to determine a relative weighting of inputs from the first localizer or the second localizer when generating an aggregated location estimate for the first AV.

2. The system of claim 1, wherein the first location metadata indicates a location of the first AV at a time of measurement for the first location error estimate and the second location error estimate.

3. The system of claim 2, wherein the second location metadata indicates a location of the second AV at a time of measurement for the third location error estimate and the fourth location error estimate.

4. The system of claim 3, wherein the location of the first AV and the location of the second AV are part of a common location classification based on the first environmental metadata and the second environmental metadata.

5. The system of claim 3, wherein the location of the first AV and the location of the second AV are different.

6. The system of claim 1, wherein the first environmental metadata further comprises information indicating environmental conditions around the first AV, and the second environmental metadata further comprises information indicating environmental conditions around the second AV.

7. The system of claim 1, wherein the first localizer of the first AV comprises a combination of the LiDAR localizer, a GNSS localizer, and an Inertial Measurement Unit (IMU) localizer.

8. The system of claim 1, wherein the second localizer of the first AV comprises a combination of the GNSS localizer, an Inertial Measurement Unit (IMU) localizer, and a LiDAR localizer.

9. The system of claim 1, wherein the first localizer of the first AV is different from the second localizer of the first AV.

10. The system of claim 1, wherein the first localizer of the first AV is the same as the first localizer of the second AV.

11. A computer-implemented method for determining a localization error, comprising:

receiving a first location error estimate, corresponding with a first localizer of a first autonomous vehicle (AV), the first localizer of the first AV comprising a Light Detection and Ranging (LiDAR) localizer;

receiving a second location error estimate, corresponding with a second localizer of the first AV, the second localizer of the first AV comprising a Global Navigation Satellite System (GNSS) localizer;

associating the first location error estimate and the second location error estimate with first location metadata and first environmental metadata corresponding with the first AV, the first environmental metadata comprising a first measure of scene complexity based on a first amount of motion of moving entities detected by the first AV and an indication of a presence of foliage having diffuse reflection properties that degrade accuracy of the first localizer of the first AV;

receiving a third location error estimate, corresponding with a first localizer of a second AV, the first localizer of the second AV comprising a LiDAR localizer;

receiving a fourth location error estimate, corresponding with a second localizer of the second AV, the second localizer of the second AV comprising a GNSS localizer;

associating the third location error estimate and the fourth location error estimate with second location metadata and second environmental metadata associated with the second AV, the second environmental metadata comprising a second measure of scene complexity based on a second amount of motion of moving entities detected by the second AV and an indication of a presence of foliage having diffuse reflection properties that degrade accuracy of the first localizer of the second AV;

determining a location error variance for each of the first localizer and the second localizer of the first AV, based on the first location metadata, the first environmental metadata, the second location metadata, and the second environmental metadata; and transmitting the location error variance to the first AV, the location error variance, when received by the first AV, is configured to cause the first AV to update an uncertainty parameter of the first localizer or the second localizer of the first AV during a subsequent localization instance when the first AV determines that a similarity score between third environmental metadata corresponding with the first AV and the first environmental metadata exceeds a predetermined threshold, wherein the updated uncertainty parameter is used by a sensor fusion process of the first AV to determine a relative weighting of inputs from the first localizer or the second localizer when generating an aggregated location estimate for the first AV.

12. The computer-implemented method of claim 11, wherein the first location metadata indicates a location of the first AV at a time of measurement for the first location error estimate and the second location error estimate.

13. The computer-implemented method of claim 12, wherein the second location metadata indicates a location of the second AV at a time of measurement for the third location error estimate and the fourth location error estimate.

14. The computer-implemented method of claim 13, wherein the location of the first AV and the location of the second AV are part of a common location classification based on the first environmental metadata and the second environmental metadata.

15. The computer-implemented method of claim 13, wherein the location of the first AV and the location of the second AV are different.

16. The computer-implemented method of claim 11, wherein the first environmental metadata further comprises information indicating environmental conditions around the first AV, and the second environmental metadata further comprises information indicating environmental conditions around the second AV.

17. The computer-implemented method of claim 11, wherein the first localizer of the first AV comprises a combination of the LiDAR localizer, a GNSS localizer, and an Inertial Measurement Unit (IMU) localizer.

18. The computer-implemented method of claim 11, wherein the second localizer of the first AV comprises a combination of the GNSS localizer, an Inertial Measurement Unit (IMU) localizer, and a LiDAR localizer.

19. The computer-implemented method of claim 11, wherein the first localizer of the first AV is different from the second localizer of the first AV.

20. A non-transitory computer-readable storage medium comprising at least one instruction for causing a computer or processor to:

receive a first location error estimate, corresponding with a first localizer of a first autonomous vehicle (AV), the first localizer of the first AV comprising a Light Detection and Ranging (LiDAR) localizer;

receive a second location error estimate, corresponding with a second localizer of the first AV, the second localizer of the first AV comprising a Global Navigation Satellite System (GNSS) localizer;

associate the first location error estimate and the second location error estimate with first location metadata and first environmental metadata corresponding with the first AV, the first environmental metadata comprising a first measure of scene complexity based on a first amount of motion of moving entities detected by the first AV and an indication of a presence of foliage having diffuse reflection properties that degrade accuracy of the first localizer of the first AV;

receive a third location error estimate, corresponding with a first localizer of a second AV, the first localizer of the second AV comprising a LiDAR localizer;

receive a fourth location error estimate, corresponding with a second localizer of the second AV, the second localizer of the second AV comprising a GNSS localizer;

associate the third location error estimate and the fourth location error estimate with second location metadata and second environmental metadata associated with the second AV, the second environmental metadata comprising a second measure of scene complexity based on a second amount of motion of moving entities detected by the second AV and an indication of a presence of foliage having diffuse reflection properties that degrade accuracy of the first localizer of the second AV;

determine a location error variance for each of the first localizer and the second localizer of the first AV, based on the first location metadata, the first environmental metadata, the second location metadata, and the second environmental metadata; and transmit the location error variance to the first AV, the location error variance, when received by the first AV, is configured to cause the first AV to update an uncertainty parameter of the first localizer or the second localizer of the first AV during a subsequent localization instance when the first AV determines that a similarity score between third environmental metadata corresponding with the first AV and the first environmental metadata exceeds a predetermined threshold, wherein the updated uncertainty parameter is used by a sensor fusion process of the first AV to determine a relative weighting of inputs from the first localizer or the second localizer when generating an aggregated location estimate for the first AV.

* * * * *